Apr. 10, 1923.  
J. L. FAY  
1,451,388  
CHASSIS LUBRICATION AND CLEANING SYSTEM  
Filed Feb. 23, 1921
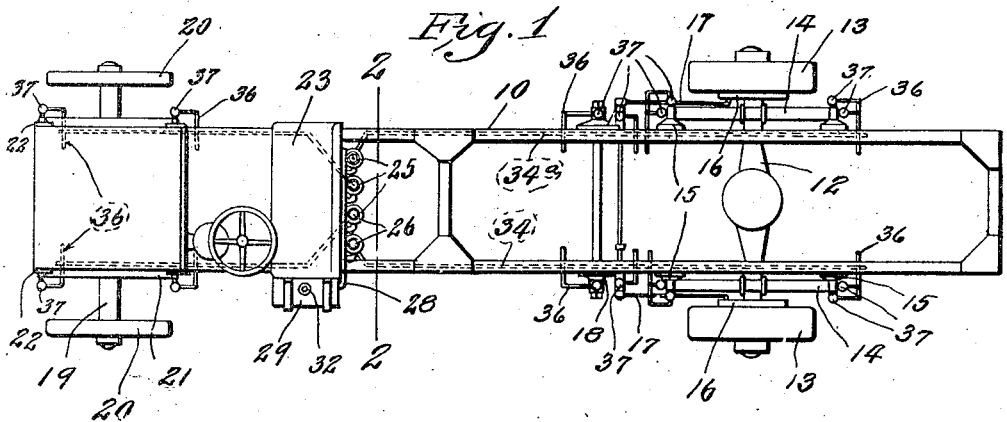
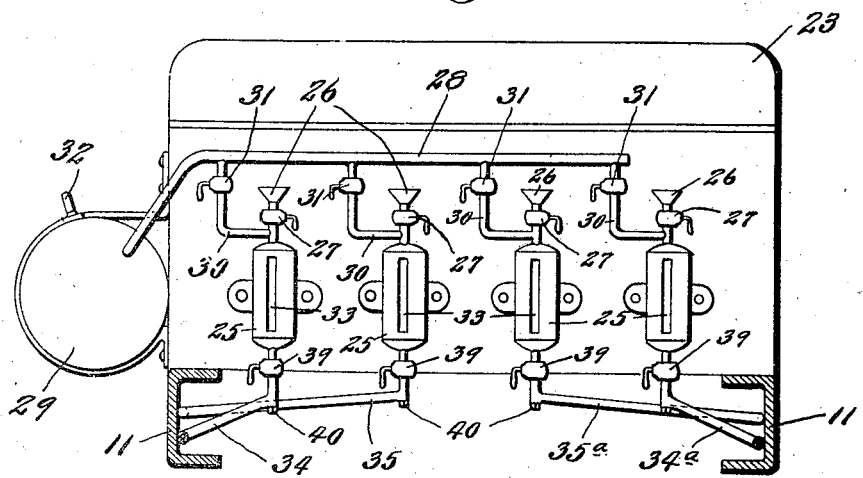
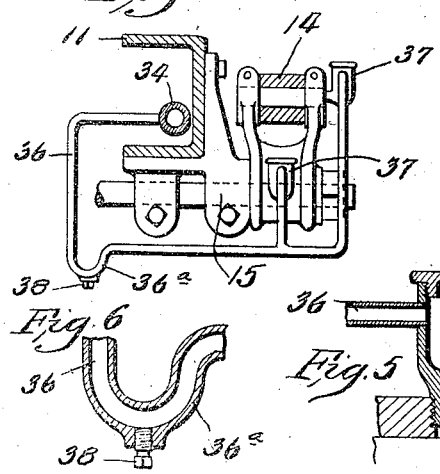
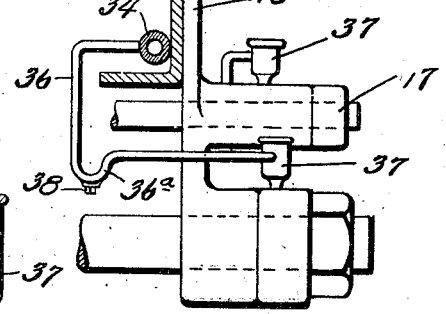
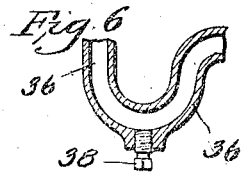
Inventor- John L. Fay  
By J. R. Cornwall Atty Patented Apr. 10, 1923.

1,451,388

UNITED STATES PATENT OFFICE.

JOHN L. FAY, OF ST. LOUIS, MISSOURI.

CHASSIS LUBRICATING AND CLEANING SYSTEM.

Application filed February 23, 1921. Serial No. 447,063.

*To all whom it may concern:*

Be it known that I, JOHN L. FAY, a citizen of the United States, residing at St. Louis, Missouri, have invented a certain new and useful Improvement in Chassis Lubrication and Cleaning Systems, of which the following is a full, clear, and exact description, such as will enable others skilled in the art to which it appertains to make and use the same, reference being had to the accompanying drawings, forming part of this specification.

This invention relates to motor vehicles, and its principal object is to provide means for distributing under air pressure a suitable lubricant to the bearings carried on the chassis and the mechanism associated therewith.

Another object of the invention is to provide an air pressure lubricating system for the chassis, which system can be utilized when so desired for cleaning the distributing chambers and the bearings and for removing the gummy substances and grit formed or lodged therein by the substitution of a suitable solvent, such as coal-oil, gasoline, etc., for the lubricant in said system.

Further objects of the invention are, to provide suitable connections and manually controlled means therefor so that the supply of the lubricant and the admission of the compressed air to the system can be easily and quickly controlled by the operator.

Still another object is to provide visual means in the system whereby the operator can immediately ascertain the true working conditions of the system so that if any of the distributing connections or receptacles are not working properly, the operator can readily detect the faulty connection and either repair or replace it.

In the drawings,—

Figure 1 is a plan view of the chassis of a truck equipped with my chassis lubricating system.

Figure 2 is a transverse vertical cross section taken on the line 2—2 of Figure 1.

Figure 3 is a detail view showing the branch connections between one of the supply lines and the lubricant cups of the forward end of one of the rear springs.

Figure 4 is a detail view showing the branch connections between one of the supply lines and the lubricant cups of the brake rods.

Figure 5 is a vertical cross section of one of the lubricant cups and its corresponding branch pipe connections.

Figure 6 is a detail cross section of a goose-neck portion of one of the branch pipes.

Referring by numerals to the accompanying drawings, 10 indicates the chassis of a truck having side frames or channel members 11. The rear axle 12 is provided with rear wheels 13 and springs 14, the ends of which are secured to the brackets 15 carried by chassis 10. The rear wheels are equipped with the usual brakes 16 which are operated by brake rods 17 journaled in brackets 18 which are fixed on the outside of channel members 11. The front axle 19 is provided with wheels 20 and springs 21, the latter being connected to the chassis by brackets 22.

Four short tubular sections or receptacles 25 are vertically disposed in an easily accessible position on the chassis,—in the present instance, in the rear of driver's seat 23. The upper ends of tubular receptacles 25 are reduced in cross section and are provided with open-topped funnel-shaped members 26. Suitable valves 27 are interposed between the reduced upper ends of receptacles 25 and funnels 26 and control the communication therebetween.

Main pipe 28 leading from compressed air tank 29 carried by the chassis is provided with branch pipes 30 which are connected to the upper ends of receptacles 25 immediately below valves 27. Branch pipes 30 have valves 31 which control the admission of compressed air from tank 29 to receptacles 25. An intake valve 32 on tank 29 allows the replenishing of the tank with the compressed air in the same manner in which the automobile tires are inflated.

The tubular receptacles 25 are provided with narrow sections or inserts 33 of transparent material such as glass which permit the visual inspection to ascertain that the lubricant is properly fed therefrom. The lower end of each tubular receptacle 25 is connected to a corresponding main supply pipe 34, 34ª, 35, and 35ª, pipes 34 and 34ª supplying the bearings on the left and right sides of the rear end of the chassis, and pipes 35 and 35ª supplying the bearings on the left and right sides respectively, of the front end of the chassis.

Branch pipes 36 lead from the main supply pipes and supply cups 37 located on the various bearings on the chassis with lubricant. Each branch pipe is preferably provided with a downwardly extending gooseneck portion 36ᵃ having a removable plug 37ᵃ so that any sediment or grit will be trapped in this downward extension. These extensions can be cleaned by unscrewing plug 38 and removing the sediment or grit from said extension. Valves 39 are located in pipes 34, 34ᵃ, 35, and 35ᵃ, and control the communication between said pipes and their respective receptacles.

In the operation of the system, tank 29 is charged with compressed air, preferably at a filling station, by connecting a supply pipe to the valve 32. Valves 31 and 39 are closed and valves 27 are opened and the receptacles 25 are filled with oil through funnel-shaped members 26. After the lubricant reaches the desired level in receptacles 26, valves 27 are closed and valves 39 and air valves 31 are opened. The opening of valves 31 admits compressed air from tank 29 through pipe 28 and branch pipes 30 to receptacles 25 and forces the lubricant therein through supply pipes 34, 34ᵃ, 35, and 35ᵃ into their corresponding branch pipes 36 and lubricant cups 37. The lubricant is then distributed under pressure from cups 37 between the rubbing surfaces of the bearings. If any of the cups do not work properly or any of the lubricant distributing channels become choked, the descent of the level of the lubricant in its corresponding receptacle 25 will be much slower or the level of the lubricant in receptacle 25 will remain stationary. This the operator can readily ascertain by inspecting the transparent inserts 33 in receptacles 25.

When it is desired to clean the pipe connections and the bearings, some of the plugs 38 are removed to allow the draining of the lubricant from the pipe connections. If for any reason a portion of the lubricant remains in receptacle 25, plug 40 located in each pipe 34, 34ᵃ, 35 and 35ᵃ can be removed permitting the lubricant in receptacle 25 to be drained therefrom. After all the surplus oil has been removed, plugs 38 and 30 are replaced in their places and valves 31 are closed. Valves 27 are now opened and the receptacles are filled through funnel-shaped members 26 with a suitable cleaning liquid or solvent, such as coal-oil or gasoline. Valves 27 are now closed and air valves 31 are opened, admitting compressed air into the upper portions of the receptacles 25, thereby forcing the cleaning liquid into the pipe connections, cups 37, and their respective bearings.

The action of the solvent will dissolve any gummy substances which might have accumulated in the passageways or in the bearings and the continued air pressure will force the solvent outwardly through the bearings. After the bearings and the pipe connections have been cleaned, valves 39 and 31 are closed and valves 27 opened and receptacles 25 are refilled with the lubricant. Valves 27 are now closed and valves 31 and 39 are opened which will admit compressed air into the receptacles 25 and permit the lubricant to descend to the open valves 39 and main supply pipes and their corresponding branch pipes to the lubricant cups and the various bearings.

A vehicle equipped with my chassis lubricating system is assured with very little labor of an effective lubrication of all the wearing parts of the chassis, thereby eliminating the noises due to insufficient lubrication and reducing the depreciation of the vehicle to minimum.

Obviously various changes of parts can be made and substituted for those herein shown and described, without departing from the spirit of the invention, the scope of which is set forth in the appended claims.

I claim:

1. In a chassis lubricating system, the combination with the bearings of a chassis, of receptacles mounted on said chassis and adapted to receive lubricant, pipe connections between said receptacles and the bearings on said chassis, drain plugs in the lowermost portions of said pipe connections, a compressed air-tank, and means for admitting compressed air from said air-tank to said receptacles, whereby said lubricant is forced through said pipe connections into said bearings.

2. In a chassis lubricating system, the combination with the bearings of a chassis, of receptacles mounted on said chassis and adapted to receive lubricant, pipe connections between said receptacles and the bearings on said chassis, compressed air tank, conduits for admitting compressed air from said air tank to said receptacles, whereby said lubricant is forced through said pipe connections into said bearings, a plug in each pipe connection immediately below the receptacle for draining the latter, and means for controlling the admission of the compressed air to said receptacles.

3. In a chassis lubricating system, a plurality of receptacles adapted to receive lubricant, a main pipe connection leading from each receptacle, a plurality of branch pipe connections leading from said main pipe to the bearings on said chassis, a compressed air tank, pipe connections from said tank to said receptacles, whereby the lubricant contained therein is forced under pressure through said main pipe and its branch connections to the chassis bearings, and valves in said main pipe connections.

4. In an automobile chassis lubricating system, the combination with the chassis bearings, of a container adapted to receive a suitable liquid, means for controlling the communication between said container and the atmosphere, a main conduit leading from said container, branch conduits leading from said main conduit to said bearings, a valve in said main conduit, a compressed air tank, pipe connection between said air tank and the upper end of said container for admitting compressed air to the latter and thereby force the liquid therefrom into the chassis bearings, and a manually operable valve for controlling the admission of compressed air from said air tank to said container.

In testimony whereof I hereunto affix my signature this 19th day of February, 1921.

JOHN L. FAY.